United States Patent
Kim et al.

(10) Patent No.: US 10,289,076 B2
(45) Date of Patent: May 14, 2019

(54) CONCIERGE ROBOT SYSTEM, CONCIERGE SERVICE METHOD, AND CONCIERGE ROBOT

(71) Applicant: ROBORUS CO., LTD., Seoul (KR)

(72) Inventors: Dae Hoon Kim, Seoul (KR); Hong Gi Kim, Namyangju-si (KR); Tae Hyun Lee, Seongnam-si (KR); Cheul Min Kim, Goyang-si (KR); Sang Ki Lee, Seongnam-si (KR)

(73) Assignee: ROBORUS CO., LTD., Seoul (KR)

( * ) Notice: Subject to any disclaimer, the term of this patent is extended or adjusted under 35 U.S.C. 154(b) by 0 days.

(21) Appl. No.: 15/661,098

(22) Filed: Jul. 27, 2017

(65) Prior Publication Data
US 2018/0136615 A1 May 17, 2018

(30) Foreign Application Priority Data

Nov. 15, 2016 (KR) .................... 10-2016-0152216
Jun. 13, 2017 (KR) .................... 10-2017-0074432

(51) Int. Cl.
*G06N 3/08* (2006.01)
*G06N 5/02* (2006.01)
(Continued)

(52) U.S. Cl.
CPC ........... *G05B 13/027* (2013.01); *B25J 11/001* (2013.01); *G05B 13/041* (2013.01); *G06N 3/08* (2013.01);
(Continued)

(58) Field of Classification Search
USPC ........................................... 704/272
See application file for complete search history.

(56) References Cited

U.S. PATENT DOCUMENTS

2012/0191460 A1* 7/2012 Ng-Thow-Hing ...... G10L 21/10
704/272
2016/0114488 A1 4/2016 Mascorro Medina et al.

FOREIGN PATENT DOCUMENTS

JP 2004-261941 9/2004
JP 2008-055578 3/2008
(Continued)

OTHER PUBLICATIONS

NPL Reference (Hilton and IBM built a Watson-powered concierge robot), (by Statt, Nick) (Year: 2016).*

*Primary Examiner* — Tarek Elchanti
(74) *Attorney, Agent, or Firm* — Lex IP Meister, PLLC

(57) ABSTRACT

A concierge robot system, a concierge service method, and a concierge robot are provided. The system provides an artificial intelligence type of concierge service, and includes: a user interface device that receives an external image and an external voice, and outputs the received image or voice on a screen or by voice; a storage device where a program that provides data through the user interface device based on learning data generated by using a neural network model is stored; and a processor that executes the program, wherein the program includes instructions for recognizing an emotion of a user, identified from the external image based on the learning data, outputting data that represents an emotion according to the emotion recognition to the screen, generating a conversation sentence that corresponds to natural language of web data externally collected through web scraping based on the learning data and outputting it by voice, generating user recommendation data for the identified user based on the learning data, and outputting the user recommendation data on the screen or processing it into natural language and outputting a corresponding conversation sentence by voice.

2 Claims, 11 Drawing Sheets

(51) Int. Cl.
  *B25J 11/00*     (2006.01)
  *G05B 13/02*     (2006.01)
  *G05B 13/04*     (2006.01)
  *G06Q 20/10*     (2012.01)
  *G06Q 20/20*     (2012.01)
  *G06Q 30/02*     (2012.01)

(52) U.S. Cl.
  CPC .............. *G06N 5/022* (2013.01); *G06Q 20/10* (2013.01); *G06Q 20/202* (2013.01); *G06Q 20/209* (2013.01); *G06Q 30/0269* (2013.01); *G06Q 30/0277* (2013.01)

(56) References Cited

FOREIGN PATENT DOCUMENTS

| | | | |
|---|---|---|---|
| JP | 2008055578 A * | 3/2008 | |
| JP | 5684911 | 9/2013 | |
| KR | 10-2008-0008528 | 1/2008 | |
| KR | 20080008528 A * | 1/2008 | |
| KR | 10-0854675 | 8/2008 | |
| KR | 10-2010-0001928 | 1/2010 | |
| KR | 20100001928 A * | 1/2010 | |
| KR | 10-2011-0004015 | 1/2011 | |
| KR | 20110004015 A * | 1/2011 | |
| KR | 10-2013-0039578 | 4/2013 | |
| KR | 10-2013-0091364 | 8/2013 | |
| KR | 10-2013-0094058 | 8/2013 | |
| KR | 10-1336641 | 12/2013 | |
| KR | 10-2015-0120210 | 10/2015 | |
| KR | 10-1707979 | 2/2017 | |
| KR | 10-1707982 | 2/2017 | |
| WO | WO-0230629 A1 * | 4/2002 | ............. A63H 11/00 |

\* cited by examiner

CONCIERGE ROBOT SYSTEM, CONCIERGE SERVICE METHOD, AND CONCIERGE ROBOT

CROSS-REFERENCE TO RELATED APPLICATION

This application claims priority to and the benefit of Korean Patent Application Nos. 10-2016-0152216 and 10-2017-0074432 filed in the Korean Intellectual Property Office on Nov. 15, 2016 and Jun. 13, 2017, the entire contents of which are incorporated herein by reference.

BACKGROUND OF THE INVENTION

(a) Field of the Invention

The present invention relates to a concierge robot system, a concierge service method, and a concierge robot.

(b) Description of the Related Art

Intelligent robots providing services to humans seem to be highly utilized in places like restaurants and homes, and accordingly studies and researches on suitable robots are underway.

In the era of industrialization of robots, differentiated services are required to increase satisfaction of customers and meet customer's usage tendencies at a time when expectation of utilization of robots in service-providing places such as restaurants is being increased.

Conventionally, a kiosk, which is an unmanned general information guidance system, is installed at a service-providing place such as a restaurant to provide automated services. However, such a kiosk is a mere attempt at computerization by installing only network devices, but it is far from providing interaction with customers or providing differentiated services to customers.

In addition, since only a ticket dispenser function that automates menu selection and settlement according to an order is provided, various needs of a customer cannot be satisfied.

Further, although the robot technology is applied to the unmanned general information guidance system, since outputs of the robot are predefined for specific inputs of a user, behaviors of the robot are simply repetition of output of instructions rather than communication with the user. Accordingly, a service robot for convenience of the user needs to perform intelligent tasks and interact with the user so as to respond to various needs of the user.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a concierge robot system that provides customized information by accurately determining an emotion and a requirement of a user when providing a concierge service such as a face-to-face service using a robot, as well as a concierge service method and a concierge robot.

According to one feature of the present invention, a concierge robot system that provides an artificial intelligence type of concierge service is provided. The concierge robot system includes: a user interface device that receives an external image and an external voice, and outputs the received image or voice on a screen or by voice; a storage device where a program that provides data through the user interface device based on learning data generated by using a neural network model is stored; and a processor that executes the program, wherein the program includes instructions for recognizing an emotion of a user, identified from the external image based on the learning data, outputting data that represents an emotion according to the emotion recognition to the screen, generating a conversation sentence that corresponds to natural language of web data externally collected through web scraping based on the learning data and outputting it by voice, generating user recommendation data for the identified user based on the learning data, and outputting the user recommendation data on the screen or processing it into natural language and outputting a corresponding conversation sentence by voice.

The concierge robot system further includes a communication device that transmits and receives wireless data in a limited communication area, wherein the program includes instructions for broadcasting a concierge service providing a uniform resource locator (URL) through the communication device and generating concierge service data to be received by a user according to a user's request acquired through the concierge service providing URL, and the concierge service providing URL may provide a concierge service that includes at least one of membership guide information, a personal information usage agreement request, service shop information, service menu information, a waiting number guide, a product or service order, and an online payment service to an accessed user terminal.

The program may include instructions for broadcasting the concierge service providing URL for providing marketing information that includes at least one of service recommendation information derived by matching a plurality of user personal data including at least one of a user visit history, a service use history, and a payment history, and customer relationship management (CRM) data, promotion information, and advertisement information.

The program may include instructions for generating a relationship between a plurality of user personal data including at least one of a user visit history, a service use history, and a payment history, and emotion learning data and customer relationship management (CRM) data, as a neural network, and generating the user recommendation data by backward propagating the neural network.

The concierge robot system may further include a server interface device that transmits and receives data to/from an external cloud server in a wired or wireless manner, wherein the program may acquire emotion learning data by performing emotion learning that corresponds to a face image recognized from the external image by transmitting the face image to the cloud server, and may include instructions for receiving emotion recognition corresponding to the face image input from the user interface device by transmitting an emotion recognition request with respect to the face image to the cloud server.

The program may include instructions for generating corresponding natural language by processing data that represents the emotion and the user recommendation data, learning a conversation sentence that corresponds to the natural language by using the neural network model, and generating the conversation sentence by using a result of the learning.

The concierge robot system may further include a server interface device that transmits and receives data to/from an external cloud server in a wired or wireless manner, and the program may include instructions for generating corresponding natural language by processing data that represents the emotion and the user recommendation data, learning a conversation sentence that corresponds to the natural language by using the neural network model by transmitting the natural language to the cloud server, and receiving a conversation sentence generated by using a result of the learning. The program may include instructions for applying a concierge service defined by a model, view, and controller (MVC), and generating the user recommendation data by big-data processing the plurality of user personal data, the emotion learning data, and the CRM data.

The concierge robot system may include a point of sale (POS) device that processes a product and service order according to a result of the voice recognition and performs a payment process with a payment server that is connected with a communication network, and the program may include instructions for collecting order details and payment details from the POS device and stores the collected information as the user personal data.

The interface device may include: an image input device that captures the external image; a display device that visually displays data on a screen; a voice input device that receives the external voice; a voice output device that outputs the conversation sentence by voice; and a light emission unit that includes at least one light emitting diode (LEDs) that is driven according to a control signal, and the program may include instructions for outputting the conversation sentence to the voice output device, outputting the user recommendation data and data that represents the emotion through the display device, and outputting a signal that controls at least one of light emission time, a color of light emission, and a light emission amount according to the data that represents the emotion.

According to another feature of the present invention, a concierge service method performed by a concierge robot system that is driven by at last one processor is provided. The concierge service method includes: when an external image is input, identifying a user from a face image recognized from the external image based on user feature data extracted from learning of a neural network model; recognizing an emotion of the identified user from the face image based on emotion learning data of emotions that correspond to a plurality of face images, learned by using the neural network model; generating emotion expression data according to the emotion recognition and outputting the generated emotion expression data through a display device; generating a conversation sentence that corresponds to a natural language of web data that is externally collected through web scraping based on a result of learning of a conversation sentence that corresponds to the natural language by using the neural network model; and outputting voice corresponding to the conversation sentence to the outside through a voice output device.

The concierge service method may further include generating an answer with respect to natural language recognized from an external voice and outputting a voice corresponding to the answer.

The concierge service method may further include: broadcasting a concierge service providing uniform resource locator (URL) in a wireless manner in a limited communication area; generating concierge service data that is received by a user according to a request of the user, acquired through the concierge service providing URL; and processing the concierge service data into natural language and outputting a conversation sentence that corresponds to the natural language by voice, wherein the concierge service providing URL may provide a concierge service that includes at least one of membership guide information, a personal information usage agreement request, service shop information, service menu information, a waiting number guide, a product or service order, and an online payment service to an accessed user terminal The concierge service providing URL may provide marketing information that includes at least one of service recommendation information derived by matching a plurality of user personal data including at least one of a user visit history, a service use history, and a payment history, and customer relationship management (CRM) data, promotion information, and advertisement information.

The concierge service method may further include: generating a relationship between a plurality of user personal data including at least one of a user visit history, a service use history, and a payment history, and emotion learning data and customer relationship management (CRM) data, as a neural network, and generating the user recommendation data by backward propagating the neural network; and processing the user recommendation data into natural language, generating a conversation sentence that corresponds to the natural language based on a result of learning of the conversation sentence that corresponds to the natural language by using the neural network model, and outputting the generated conversation sentence by voice.

According to another feature of the present invention, a concierge robot is provided. The concierge robot includes: a main body having a predetermined shape; a display device that is provided in the main body to output data on a screen; a speaker that is provided in the main body to output voice; a camera that is provided in the main body to capture an external image; a microphone that is provided in the main body to receive an external voice; a printer that is provided in the main body to output order and payment details; a payment recognition unit that is provided in the main body to recognize a payment means in a contact or non-contact manner; an input/output portion that is provided in the main body and connected with a communication network and an external device; a memory that is provided in the main body to store a program; and a controller formed of at least one processor that executes the program, wherein the controller may recognize an emotion of a user identified from the external image based on learning data generated by using a neural network model, output data that expresses an emotion according to the emotion recognition to the display device, generate a conversation sentence that corresponds to natural language of web data externally collected through web scraping based on the learning data and output the conversation sentence to the speaker, generate a conversation sentence that corresponds to an answer with respect to a result of recognition of the external voice and output the generated conversation sentence to the speaker, process a product or service order according to a result of recognition of the external voice, output a payment processing result to the printer after performing a payment process with a payment server connected with the communication network, and output a corresponding conversation sentence by processing a result of the order process into natural language to the speaker.

The concierge robot may further include: an actuator driver that is provided in the main body and generates a driving signal; and an operation member that is provided in the main body to rotate within a range of a predetermined rotation angle or move in a predetermined direction by being driven according to the driving signal of the actuator driver.

The concierge robot may further include a light emission device that includes at least one light emitting diode (LED) that is driven according to a control signal, wherein the controller may output a signal that controls at least one of light emission time, a color of light emission, and a light emission amount according to data that expresses the emotion to the light emission device.

According to the exemplary embodiments of the present invention, visiting customers can be recognized (voice recognition, face recognition, emotion recognition, etc.) based on the learned neural network technology so that requirements of the user can be accurately determined, and accordingly customized services optimized for the customer can be provided based on AI-based differentiated intelligent services, thereby reinforcing competitiveness and improving a profit structure.

Further, service quality can be improved and more close interaction with users can be maintained in the field of repetitive business so that the frequency of use of the robot is increased, which can provide high satisfaction to both customers and producers.

DETAILED DESCRIPTION OF THE EMBODIMENTS

Figure 1:
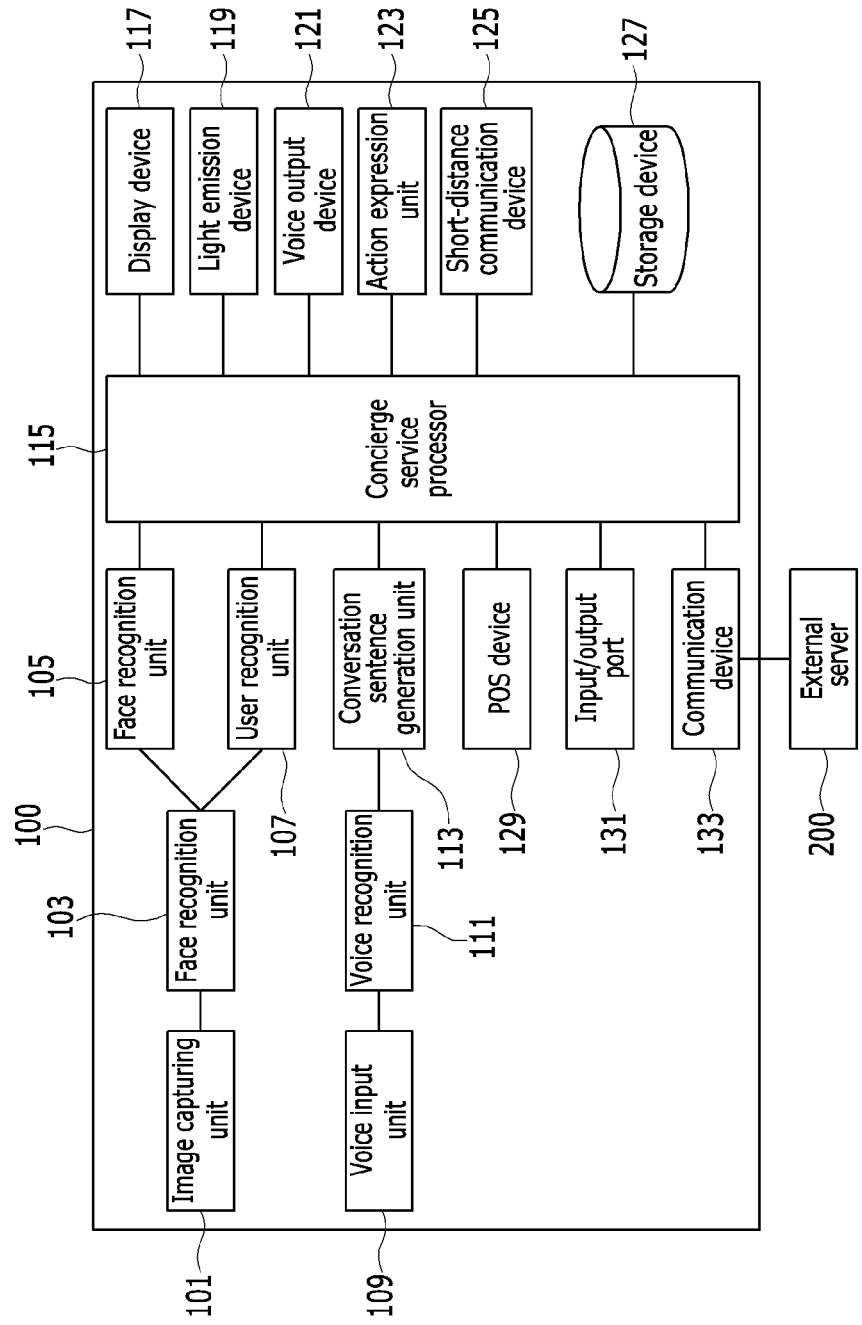
FIG. 1 is a schematic diagram of a concierge robot system according to an exemplary embodiment of the present.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. Further, terms including "unit", "module", and the like disclosed in the specification mean a unit that processes at least one function or operation, and this may be implemented by hardware or software or a combination of hardware and software.

In the specification, a concierge service is defined as a kind of gateway service for interaction with a customer to provide a service such as a secretary who determines and fulfills a customer's requests to provide convenience to the customer. Such a concierge service may be provided, for example, in restaurants, coffee shops, fast food restaurants, hotels, stores, and the like.

Hereinafter, a concierge robot system, a concierge service method, and a concierge robot according to an exemplary embodiment of the present invention will be described.

FIG. 1 is a schematic diagram of a concierge robot system according to an exemplary embodiment of the present invention.

Referring to FIG. 1, a concierge robot system 100 include an image capture unit 101, a face recognition unit 103, an emotion recognition unit 105, a user recognition unit 107, a voice input unit 109, a voice recognition unit 111, a conversation sentence generator 113, a concierge service processor 115, a display device 117, a light emission device 119, a voice output device 121, an action expression unit 123, a short-distance communication device 125, a storage device 127, a point of sale (POS) device 129, an input/output port 131, and a communication device 133.

The image capture unit 101, the voice input unit 109, the display device 117, the light emission device 119, and the voice output device 121 form a user interface device. The user interface device serves to provide an interface function to acquire information from a user and output concierge service data to the user based on the acquired information.

The image capture unit 101 captures an external image and outputs an image signal corresponding to the captured image. As the image capture unit 101, a charge coupled device (CCD) camera, a depth camera, a pan-tilt-zoom camera, and the like may be used.

The face recognition unit recognizes a face of a person in a captured image by using an image corresponding to the output image signal.

The emotion recognition unit 105 learns a plurality of face images to learn emotions of users in the face images by using a neural network model of a deep learning technology, particularly, a convolutional neural network (CNN) model. The emotion recognition unit 105 can recognize an emotion of the user corresponding to the face with the CNN model using the face image recognized by the face recognition unit as an input. For example, the emotion recognition unit 105 may recognize one of seven emotions learned in the exemplary embodiment of the present invention, such as anger, happiness, surprise, hatred, sorrow, fear, and neutrality based on the CNN model learned with respect to the face image, and outputs a result of the emotion recognition.

The user recognition unit 107 may generate learning information of already registered users by learning an image output from the face recognition unit 103 by using the CNN model.

Based on the learning information with respect to the already registered user, the user recognition unit 107 may recognize whether the already registered user is recognized by using the CNN model with the face image recognized by the face recognition unit 103 as an input. When it is recognized that the face image recognized by the user recognition unit 107 does not match any of already registered users, a process for registration of the corresponding user as a new user may be performed.

The user recognition unit 107 extracts 128 feature points for distinguishing each individual through deep CNN learning from an image of a person and a control image that is completely different from other images of the person, and performs numeric encryption and stores it as learning information.

Further, the user recognition unit 107 may recognize whether the corresponding user is already registered through a support vector machine (SVM) algorithm. Here, the SVM is a supervised learning model that provides an optimal separation boundary for classification of data, and the optimal separation boundary is located between data of each class.

The voice input unit 109 is a constituent element provided to receive an external voice, and, for example, a microphone array may be used.

The voice recognition unit 111 recognizes an external voice input through the voice input unit 109. A voice recognition technology is well known in the art, and therefore no detailed description will be provided.

The conversation sentence generator 115 performs learning to collect web data from various external servers 200 that can be accessed through the Internet, and generates a conversation sentence that corresponds to an input, which is a natural language sentence generated by natural language processing of the collected web data. Here, the learning to generate the conversation sentence that corresponds to the natural language of the web data may be performed through, for example, a recurrent neural network (RNN) model. Such an RNN is one of deep learning algorithms, and is a representative technology in artificial intelligence representation learning, which is a big issue in recent years as a field of researching how to extract useful information from data by a machine, and refers to a neural network in which a connection between units forms a directed cycle. Unlike a feedforward neural network, a recurrent neural network may utilize a memory in the neural network to process a random input, and particularly, is a model used to extract a time sequential correlation of input data. Due to such a characteristic, the RNN has been utilized in a field such as handwriting recognition with a high recognition rate. Since the RNN is well known to a person in the art, no further description will be provided.

The conversation sentence generator 115 processes web data collected from the external server 200 in real time to a natural language at a service time point, generates a conversation sentence that corresponds to an input of the natural language by using a pre-learned RNN, and then externally displays or outputs the generated conversation sentence.

The conversation sentence generator 115 generates a conversation sentence corresponding to the web data that is externally collected through web scraping based on learning data of the CNN model, and outputs the conversation sentence by voice. Then, the conversation sentence generator 115 generates a conversation sentence corresponding to an answer according to a recognition result of an external voice and outputs the generated conversation sentence by voice.

The concierge service processor 115 generates concierge service data by using data output from the emotion recognition unit 105, the user recognition unit 107, and the conversation sentence generator 113, and outputs the generated concierge service data. The concierge service processor 115 is connected with the image capture unit 101, the face recognition unit 103, the emotion recognition unit 105, the user recognition unit 107, the voice input unit 109, the voice recognition unit 111, the conversation sentence generator 113, the display device 117, the light emission device 119, the voice output device 121, the action expression unit 123, the short-distance communication device 125, the storage device 127, the POS device 129, the input/output port 131, and the communication device 133 to control the configuration thereof and process signals therebetween.

The concierge service processor 115 provides concierge service data through a user interface device based on the learning data generated by using the neural network model.

The concierge service processor 115 displays data that represents an emotion according to emotion recognition based on the learning data to a screen of the display device 117. That is, based on a current emotional state of the user according to the emotion recognition, a display for interaction with the user can be variously represented using an emoticon, a graphic, and the like.

The concierge service processor 115 generates user recommendation data for the user based on the learning data of the CNN model. In this case, a relationship between a plurality of user personal data including at least one of a user's visit history, service usage history, payment history, emotion learning data, and customer relationship management (CRM) data as a neural network, and the neural network is backward-propagated such that the user recommendation data can be generated.

The concierge service processor 115 applies a concierge service defined by a model, a view, and a controller (MVC), and processes a plurality of user personal data, emotion learning data, and CRM data into big data to use the big data in generation of user recommendation data.

Here, the user recommendation data may be favorite menu recommendation data for a regular customer or menu recommendation data that the regular customer can enjoy for free by automatic point accumulation.

Alternatively, when a customer who visits more than 3 times a week is classified as a loyal customer, user recommendation data in this case may be guide information that can apply a promotion and a discount event that corresponds to a monthly/quarterly/yearly visit count and guide information that can be directly applied on the spot.

Alternatively, when customers are classified into a loyal customer, a secession customer, and a general customer through association with the CRM, the user recommendation data may be promotion information such as a coupon that is differentiated depending on classification of the customer, a discount event, and the like.

The concierge service processor 115 may output user recommendation data to the screen or a natural conversation sentence that corresponds to a processed natural language by voice through interaction with the conversation sentence generator 113.

The concierge service processor 115 outputs the user recommendation data and a user's emotion state through the display device 117.

The concierge service processor 115 outputs a signal that controls at least one of light emission time, a color of light emission, and a light emission amount according to the user's emotion state to the light emission device 119.

The concierge service processor 115 may control operation of the action expression unit 123 according to the user's emotion state.

The concierge service processor 115 broadcasts a uniform resource locator (ULR) for providing a concierge service through the short-distance communication device 125. In addition, the concierge service processor 115 generates concierge service data that receives a user according to a user's request acquired through the concierge service providing URL.

Here, the concierge service providing URL provides a concierge service that includes at least one of member registration guide information, a request for agreement of use of personal information, service shop information, service menu information, waiting number guide, a product or service order, and on-line payment service to a terminal (not shown) of a user who access the URL. In this case, the user terminal (not shown) may be a smartphone and the like.

Further, the concierge service providing URL may provide marketing information that includes at least one of service recommendation information derived by matching a plurality of user personal data including at least one of a user's visit history, a service usage history, and a payment history, and CRM data, promotion information, and advertisement information.

Such a concierge service providing URL may include an access address of a server that provides information for providing a concierge service. Alternatively, the concierge service providing URL may include an address of a web space or an address of a storage device storing information for providing a concierge service.

The concierge service processor 115 generates natural language by processing an emotion recognition result and user recommendation data into a natural language through a connection with the emotion recognition unit 105 and the conversation sentence generator 115, learns a conversation sentence that corresponds to the natural language by using the neural network model, and generates a conversation sentence by using a result of the learning.

The display device 117 displays concierge service data output from the concierge service processor 115, displays user recognition information recognized by the user recognition unit 107, and displays a user's emotion state recognized by the emotion recognition unit 105. The display device 117 includes, for example, a display, and such a display may include at least one of a liquid crystal display (LCD), a light emitting diode (LED) display, a thin film transistor-liquid crystal display (TFT LCD), an organic light-emitting diode (OLED) display, a flexible display, a field emission display (FED), or a three-dimensional (3D) display. In addition, the display device 117 may be provided in plural.

The light emission device 119 may include at least one LED that is driven according to a control signal output from the concierge service processor 115.

The voice output device 121 outputs a voice that corresponds to a conversation sentence generated by the concierge service processor 115 to the outside. The voice output device 121 may be a speaker having a function of text to speech (TTS).

The action expression unit 123 may include an actuator driver (not shown) that generates a driving signal by control of the concierge service processor 115, and an operation member that rotates within a predetermined angle range and moves in a predetermined direction by being driven by the driving signal of the actuator driver. That is, the concierge service processor 115 may generate a control signal for rotation or movement, and outputs the generated control signal to the actuator driver. For example, when an order is received, the action expression unit 123 may turn to point to a designated place, e.g., a coffee pick-up place.

The short-distance communication device 125 transmits and receives wireless data in a limited communication area. In this case, a short-distance communication technology such as Bluetooth or Wi-Fi may be used.

The storage device 127 stores a program that provides concierge service data through a user interface device based on the learning data generated by using the neural network model. The storage device 127 may store information related to already registered users. The storage device 127 may store instructions for operation performance of the face recognition unit 103, the user recognition unit 107, the voice recognition unit 111, the emotion recognition unit 105, and the concierge service processor 115.

The storage device 127 may individually store learning information of the user recognition unit 107 and the emotion recognition unit 105.

In addition, the storage device 127 may store a plurality of user personal data that include at least one of a user visit history, a service usage history, and a payment history.

Further, the storage device 127 may generate a relationship between the plurality of user persona data, emotion learning data, and CRM data with the neural network, and may store learning data and analysis data acquired by analyzing the neural network through backward propagation.

The storage device 127 may include at least one type of storage medium among a flash memory type, a hard disk type, a multimedia card micro type, a card-type memory (for example, an SD or an XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

The POS device 129 processes a product or service order according to a voice recognition result, and performs a payment process by interacting with a payment server 200 that is connected with a communication network. Such an order history and payment history may be stored in the storage device 127.

The input/output port 131 is connected with an external device to provide a path for input and output data. In this case, the input/output port 131 may be connected with a kitchen server or a shop server provided in a service space to transmit an order detail. Alternatively, the input/output portion 131 may be a LAN cable port (or online port).

The communication device 133 transmits receives data by being connected with the external server 200 through a communication network. Here, the external server 200 includes both singular and plural. That is, the external server 20 may include a plurality of servers each performing a different function. The plurality of servers may include a marketing server that provides marketing information, a CRM server, a payment server, and the like.

Meanwhile, recently, a cloud service, which is a service used to download various data to an external cloud server instead of an internal storage space such as a user's computer or a smart phone, has been highlighted, and such a cloud service may be provided by a cloud server that provides an artificial intelligence technology. For example, Watson, which is an artificial intelligence technology of IBM or TensorFlow of Google are well known as open software. They provide technologies for utilizing artificial intelligence to understand natural language-based questions and analyzing and synthesizing relevant information from vast amounts of data to provide appropriate answers. They provide a cloud service that can use an artificial intelligence technology through an application programming interface (API).

Figure 2:
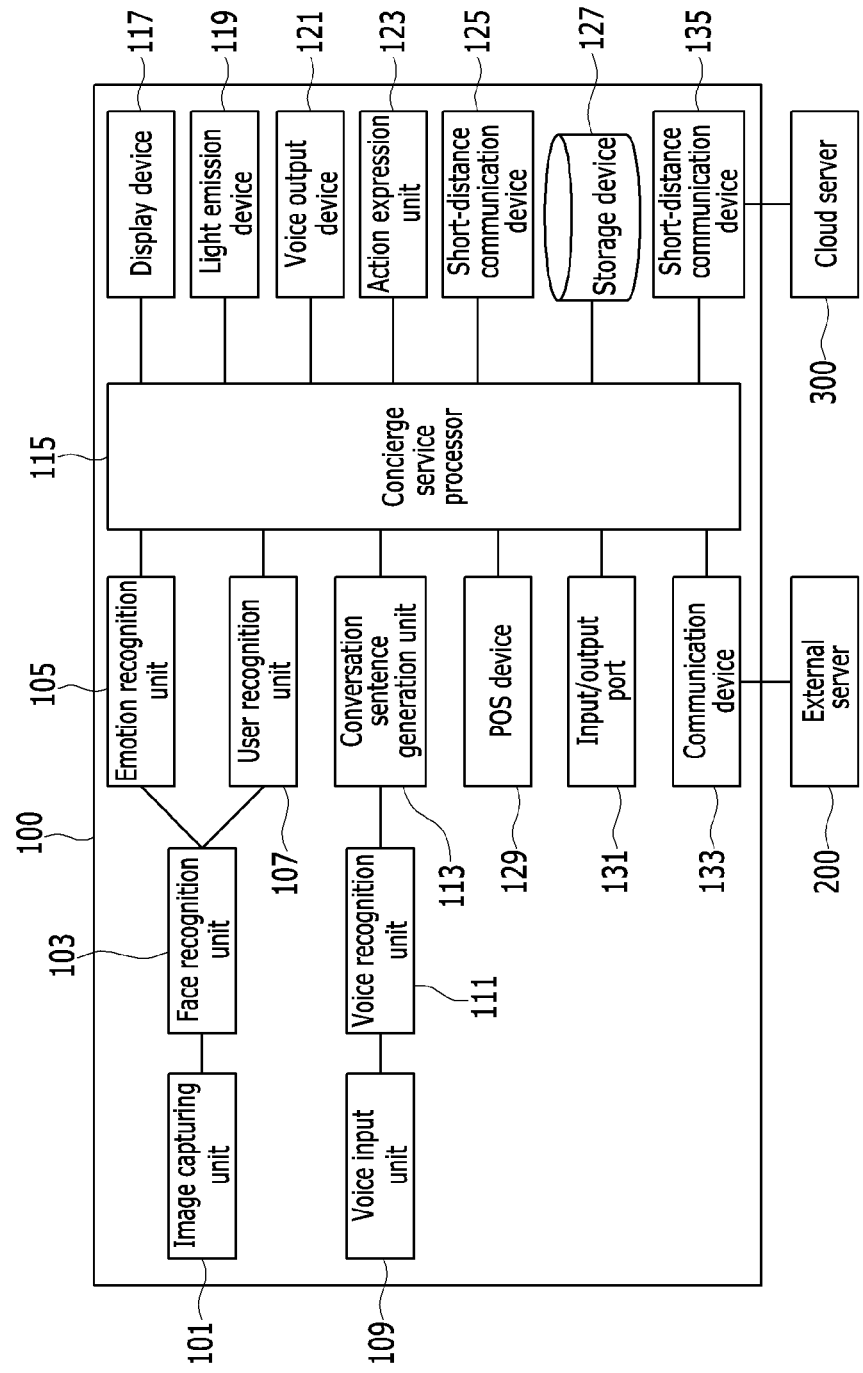
FIG. 2 is a schematic diagram of a concierge robot system according to another exemplary embodiment of the present invention.

FIG. 2 is a configuration diagram of a concierge robot system according to another exemplary embodiment of the present invention, and corresponds to an exemplary embodiment using a cloud service.

Referring to FIG. 2, a description related to the same configurations of FIG. 1 will be omitted. However, unlike the configuration shown in FIG. 2, the concierge robot system of FIG. 2 may further include a server interface device 135.

The server interface device 135 is connected with a cloud server 300. Image information, voice information, and big data are transmitted to the external cloud server 300 accessing through the API through the server interface device 135, and a user recognition result, an emotion recognition result, and a big data learning result corresponding to the transmitted data are received and used. That is, corresponding conversation sentences are learned by using user recognition learning and user emotion recognition learning through images, user recognition, and user emotion recognition based on the learning result, as well as externally collected web data, and conversation sentences that correspond to newly collected web data are generated based on the learning result, while a plurality of user personal data, emotion learning data, and CRM data are processed as big data such that a result to be produced may be received by the external cloud server 300 without directly performing an operation for neural network learning and backward propagation learning by the concierge robot system 100.

Figure 3:
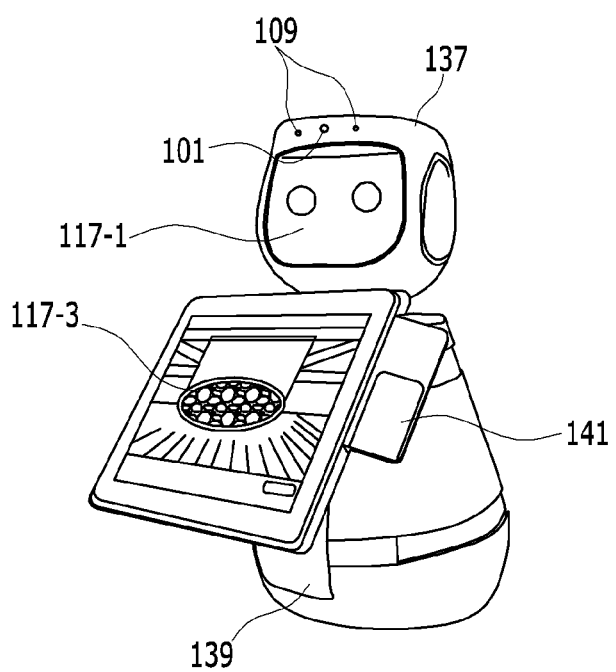
FIG. 3 is a front perspective view of a concierge robot according to an exemplary embodiment of the present invention.
Figure 4:
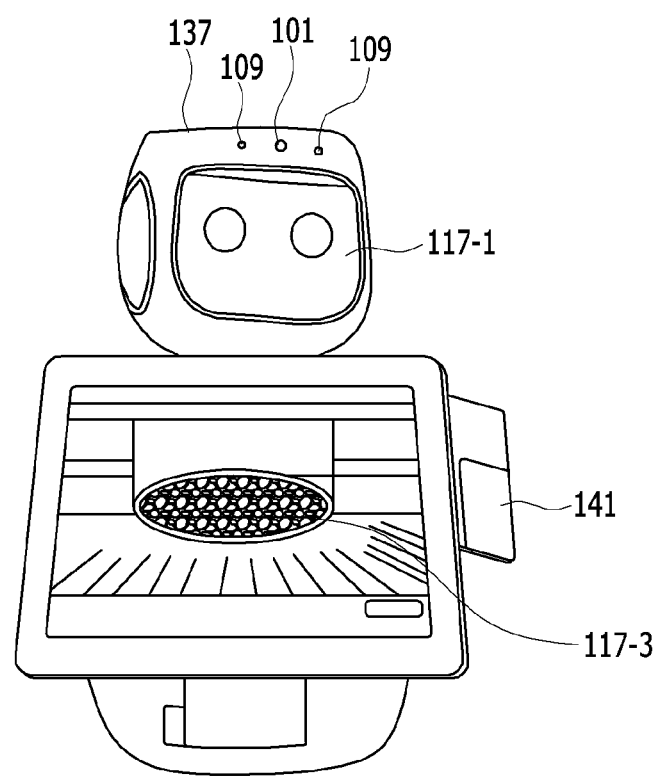
FIG. 4 is a front view of the concierge robot according to the exemplary embodiment of the present invention.
Figure 5:
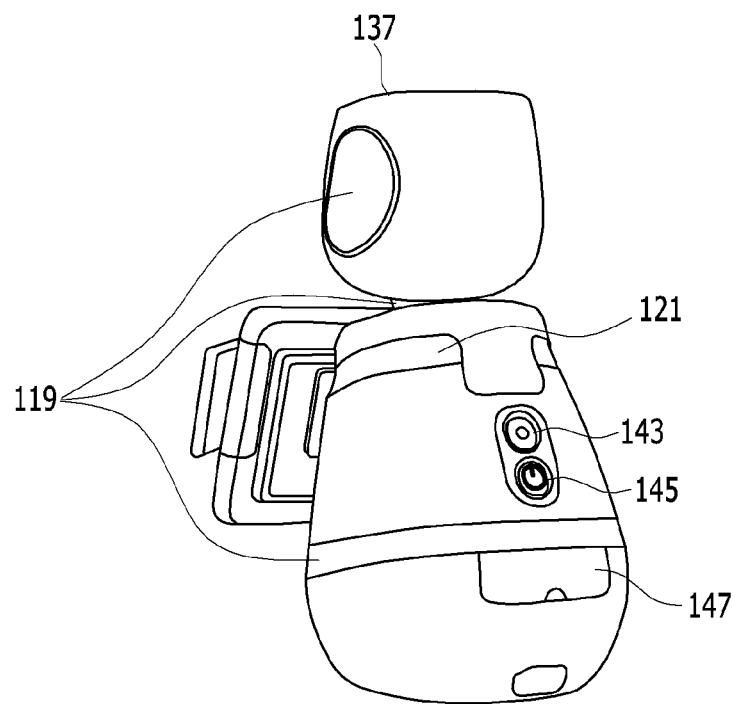
FIG. 5 is a rear perspective view of the concierge robot according to the exemplary embodiment of the present invention.

Such s concierge robot system may be implemented in the form of a robot, and FIG. 3 to FIG. 5 show an example of the robot.

FIG. 3 is a front perspective view of a concierge robot according to an exemplary embodiment of the present invention, FIG. 4 is a front view of the concierge robot according to the exemplary embodiment of the present invention, and FIG. 5 is a rear perspective view of the concierge robot according to the exemplary embodiment of the present invention.

Referring to FIG. 3 and FIG. 4, an image capture unit 101 and a voice input unit 109 are provided in a head portion of a main body 137 in the shape of a human-like robot. A first display device 117-1 that includes a screen for display such as an emoticon and the like is provided in a face portion of the main body 137. A second display device 117-3 that includes a monitor screen for outputting concierge service data, a voice recognition result, an emotion recognition result, a user recognition result, and the like is provided in a full body front of the main body 137. A payment method recognizer 141 such as an NFC reader or a card reader is provided in a side surface of the second display device 117-3. Thus, a user can directly pay after checking order details displayed on the screen.

A printer 139 is provided in a lower end body of the main body 137 to output order details or payment details.

Referring to FIG. 5, LEDs 119 are provided in a face portion and a body portion of the main body 137, respectively. A voice output device 121 is mounted around the entire body.

A reset button 143 and a power button 145 are provided in a rear side of the main body 137, and an input/output (I/O) box 147 that includes an input/output port 131 is also provided in the rear side of the main body 137.

Hereinafter, a method for providing various concierge services using a robot according to an exemplary embodiment of the present invention will be described.

Figure 6:
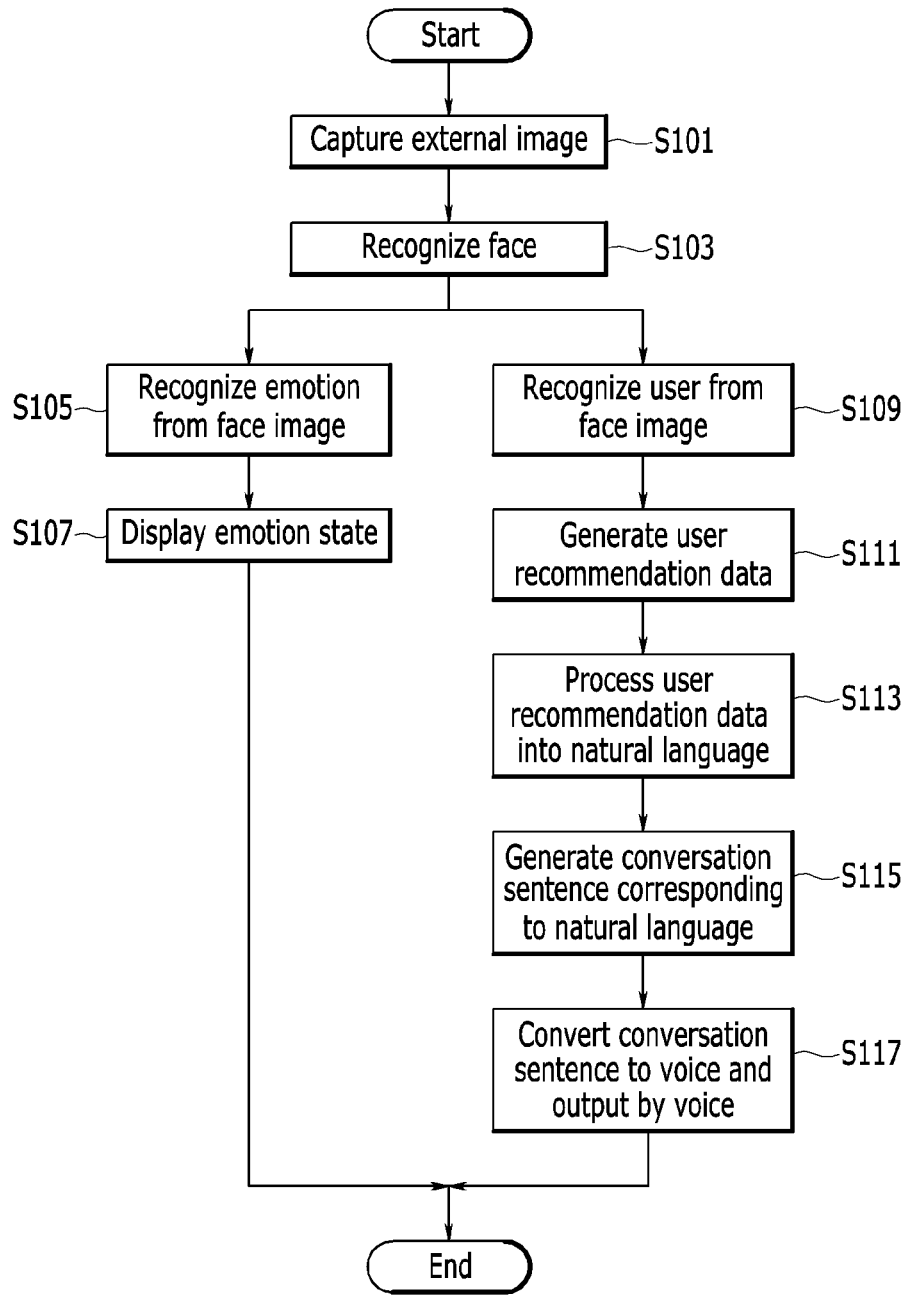
FIG. 6 is a flowchart of a concierge service method using a robot according to an exemplary embodiment of the present invention.

FIG. 6 is a flowchart of a concierge service method using a robot according to an exemplary embodiment of the present invention.

Referring to FIG. 6, an image of a user is captured by using an image capture unit 101 (S101). A face is recognized from the captured image by a face recognition unit 103 (S103).

Next, an emotion that corresponds to the face image is recognized by applying a CNN model to the recognized face image by the emotion recognition unit 105 using a face recognition unit 103 (S105). For example, one of seven emotions such as anger, happiness, surprise, hatred, sorrow, fear, and neutrality learned in the exemplary embodiment of the present invention is recognized by applying the CNN model learned with respect to the face image, and a result of the emotion recognition is output (S107). In this case, the emotion recognition result is processed into natural language and a conversation sentence that corresponds to the natural language is generated by using the CNN model and then output by voice (S107).

Alternatively, a predefined avatar corresponding to the emotion recognition result may be displayed on a display screen, or emotion expression of the robot corresponding to the emotion recognition result may be produced through LED emission.

In addition, it is recognized whether the face recognized in S103 is a face of an already registered user by using the CNN model through the user recognition unit 107 (S109). In this case, when the recognized face is recognized as an already registered user, user recognition is completed and information of the recognized user is extracted from a storage device 127 to provide information of the user. However, when the recognized face is not an already registered user, a process for registration of a new user may be performed.

When a user is identified, user recommendation data for the identified user is generated based on already generated learning data (S111). In addition, the user recommendation data is processed into natural language (S113) to generate a conversation sentence corresponding to the natural language (S115). In addition, the conversation sentence is converted to voice and output by voice (S117).

Figure 7:
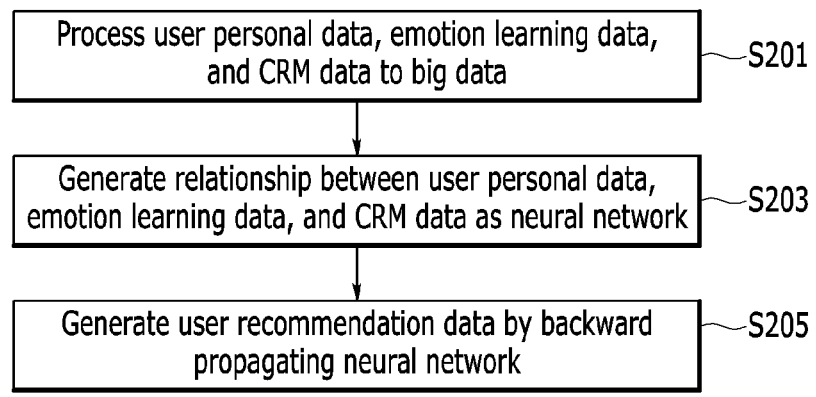
FIG. 7 is a flowchart of a concierge service method using a robot according to another exemplary embodiment of the present invention.

FIG. 7 shows a flowchart of a concierge service method using a robot according to another exemplary embodiment of the present invention, and shows a detailed process of the step S111 of FIG. 6.

Referring to FIG. 7, a concierge service processor 115 processes user personal data collected from a short-distance communication device 125 or a POS device 129, emotion learning data provided from an emotion recognition unit 105, and CRM data provided through a storage device 127 into big data (S201).

Next, a relationship between the user personal data, the emotion learning data, and the CRM data is generated through a neural network (S203). Such a neural network is backward propagated to search a service related to an emotion state of a user or a service predicted to be a user's favorite service, and generates user recommendation data from the search result (S205). In this case, a user pattern data generated in a neural network algorithm may be learned through backward propagation learning to thereby derive user recommendation data.

Figure 8:
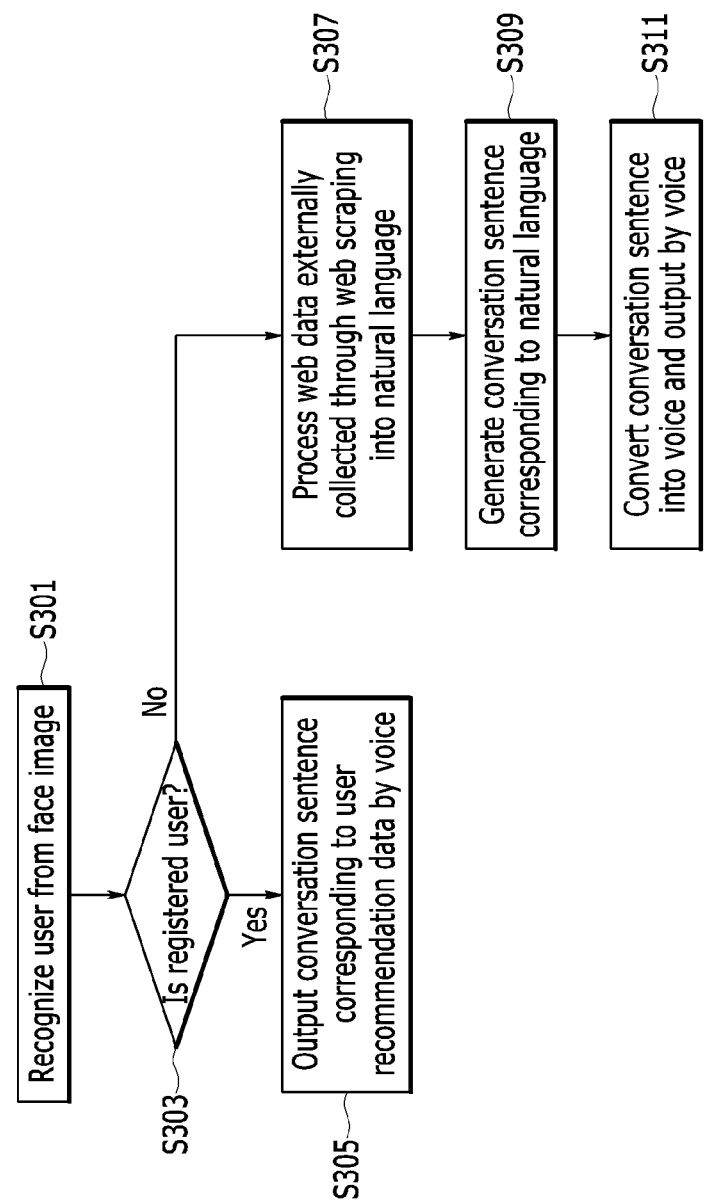
FIG. 8 is a flowchart of a concierge service method using a robot according to another exemplary embodiment of the present invention.

FIG. 8 is a flowchart of a concierge service method using a robot according to another exemplary embodiment of the present invention, and may be added as another example after the step S109 of FIG. 6.

Referring to FIG. 8, a user is recognized from a face image through a user recognition unit 107, and then it is determined whether the user is a registered user (S303).

If the user is a registered user, user recommendation data is processed into natural language, and a conversation sentence corresponding to the natural language is generated and output by voice through a conversation sentence generator 113 (S305).

If the user is not a registered user, web data externally collected through web scraping is processed into natural language through the conversation sentence generator 113 (S307), and then a conversation sentence corresponding to the natural language is generated (S309) and converted to audio and output by voice (S311).

Figure 9:
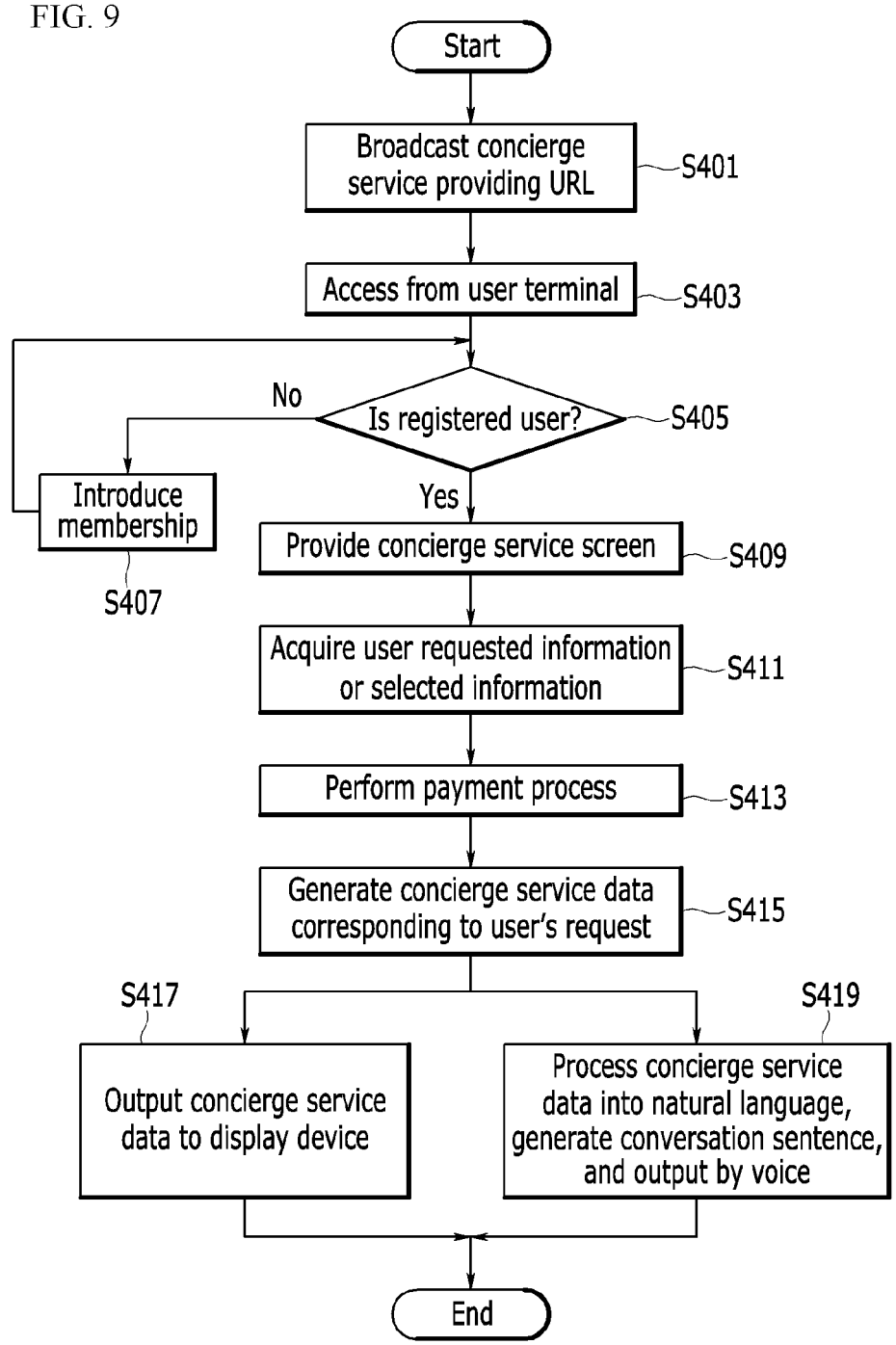
FIG. 9 is a flowchart of a concierge service method using a robot according to another exemplary embodiment of the present invention.

FIG. 9 is a flowchart of a concierge service providing method using a robot according to another exemplary embodiment of the present invention.

Referring to FIG. 9, a concierge service providing URL is wirelessly broadcasted in a limited communication area through a concierge service processor (S401).

When a user accesses the concierge service providing URL, it is determined whether or not the user is a registered user (S405), and the user is encouraged to sign up for membership if the user is not a registered user (S407).

If the user is a registered user, a concierge service screen is provided (S409), and information required by the user or selected by the user from the concierge service screen is acquired (S411). Then, a payment process is performed (S413).

Next, concierge service data that serves a user's request is generated (S415). The concierge service data is output to a display device (S417). The concierge service data is processed into natural language, and a conversation sentence corresponding to the natural language is output by voice (S419). Here, the concierge service data may be a message that the order is ready.

Figure 10:
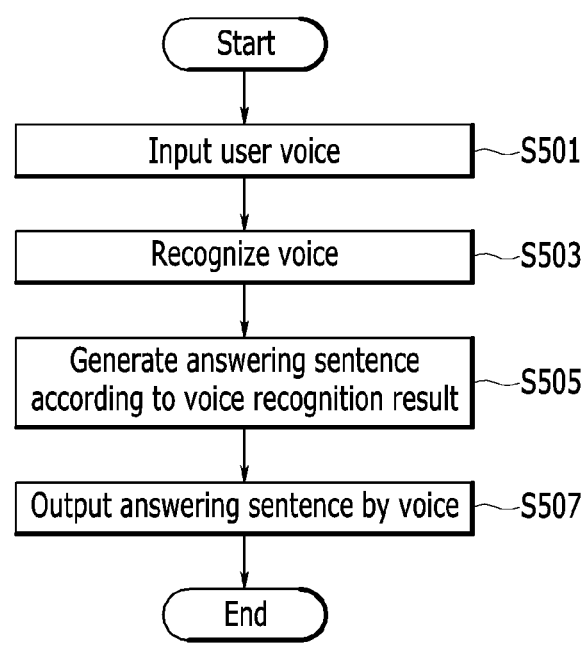
FIG. 10 is a flowchart of a concierge service method using a robot according to another exemplary embodiment of the present invention.

FIG. 10 is a flowchart of a concierge service method using a robot according to another exemplary embodiment of the present invention, and may be sequentially or simultaneously performed after the step S101 of FIG. 6.

Referring to FIG. 10, a user's voice input through a voice recognition unit (S501) is recognized (S503), and then an answering sentence according to a voice recognition result is generated through a conversation sentence generator 113 (S505). Next, the answering sentence is output by voice (S507).

Figure 11:
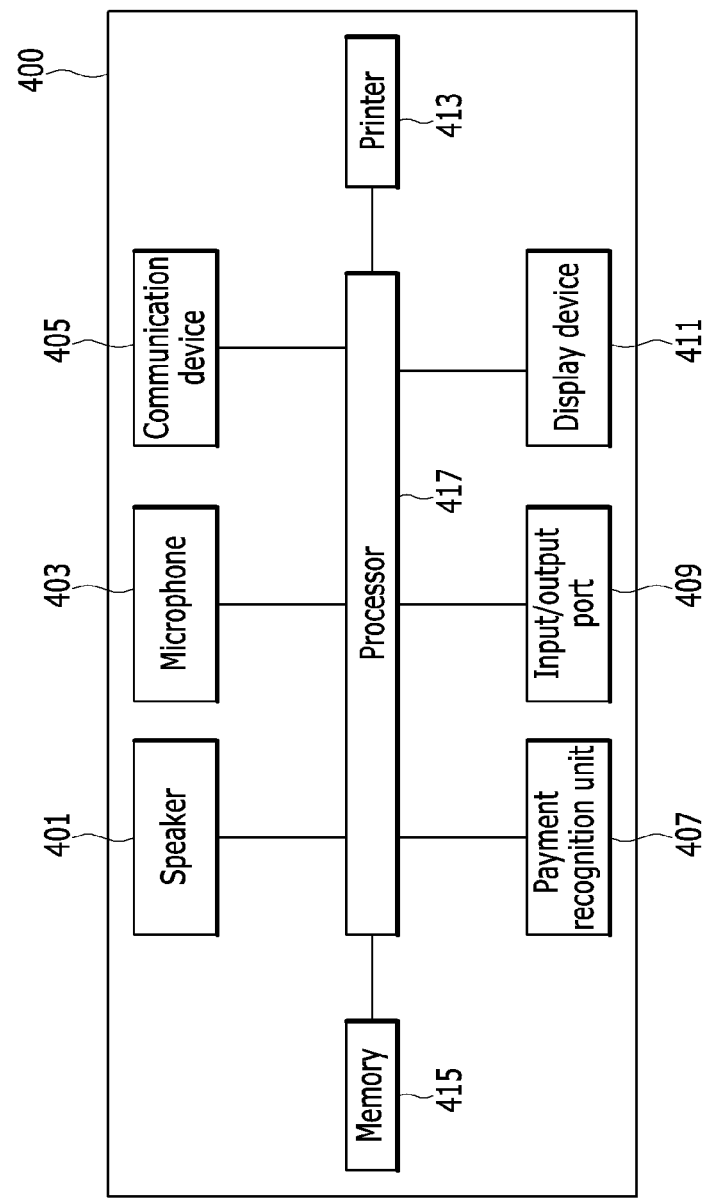
FIG. 11 is a block diagram of a hardware configuration of a concierge robot system according to another exemplary embodiment of the present invention.

FIG. 11 is a block diagram of a hardware configuration of a concierge robot system according to another exemplary embodiment of the present invention.

Referring to FIG. 11, a concierge robot system 400 is formed of hardware including a speaker 401 that outputs voice, a microphone 403 that receives an external voice, a communication device 405 that perform short-distance communication or internet connection, a payment recognition unit 407 that recognizes payment means in a contact or non-contact manner, an input/output portion 409 that is connected with a communication network or an external device, a display device 411 that visually displays data on a screen, a printer 413 that outputs order or payment details, a memory 415, and a processor 417, and a program that runs in combination with the hardware in a predetermined place is stored in the concierge robot system 400. The hardware has a configuration and performance that can perform configurations and/or methods of the above-described exemplary embodiments of FIG. 1 to FIG. 10. The program includes instructions that can execute the configuration and/or method according to the above-described exemplary embodiments of FIG. 1 to FIG. 10, and implements the present invention in combination with hardware such as the memory 415 and the processor 417.

As described above, the concierge robot system according to the exemplary embodiment of the present invention remembers a feature and information of a visiting customer through voice recognition, face recognition, and the like, learns, analyzes, and stores iterative input information of a consumer or a user by using artificial intelligence (AI), and provides a customized service to the user through a robot that is customized for the user, and accordingly, simple repetitive work that an employee has to repeat dozens and dozens of times a day at an order checkout counter in a coffee shop or a fast food store can be replicated and simplified.

The aforementioned exemplary embodiments of the present invention are not implemented only by the method and apparatus, but may be implemented by a program for realizing a function corresponding to the construction according to an exemplary embodiment of the present invention or a recording medium on which the program is recorded.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A concierge robot comprising:
a main body having a robot shape;
a camera that is provided in the main body to capture an external image;
a microphone that is provided in the main body to receive an external voice;
a speaker that is provided in the main body to output a voice;
a display device that is provided in the main body to output data on a screen;
an input/output port that is provided in the main body and connected with a communication network and an external device;
a point of sales (POS) device that is provided in the main body and processes an order of a product or a service according to a result of a voice recognition, recognizes a payment means in a contact or non-contact manner, performs a payment process with a payment server that is connected with the communication network, and outputs details of the order and payment;
a light emission unit that is provided in the main body and includes at least one light emitting diode (LEDs) that is driven according to a control signal;
an actuator driver that is provided in the main body and generates a driving signal;
an operation member that is provided in the main body to rotate within a range of a predetermined rotation angle or move in a predetermined direction by being driven according to the driving signal received from the actuator driver;
a short-distance communication device that is provided in the main body and performs short-distance wireless communication with a user terminal;

a memory that is provided in the main body to store a program that controls operation of the concierge robot based on learning data generated by using a neural network model; and a processor that executes the program, wherein the program includes instructions for:

recognizing a face image from the external image input from the camera, recognizing an emotion that corresponds to the face image using a convolutional neural network (CNN) model, generating emotion expression data including an emoticon or graphic data and outputting the generated emotion expression data to the display device, outputting a signal that controls at least one of light emission time, a color of light emission, and a light emission amount according to the generated emotion expression data to the light emission unit, generating a first conversation sentence that corresponds to a natural language of web data externally collected through web scraping based on the learning data and outputting the first conversation sentence by the voice, recognizing the external voice received from the microphone, generating a second conversation sentence corresponding to an answer according to a recognition result of the external voice and outputting the second conversation sentence by the voice, requesting the POS device to process the order of the product or and service according to the recognition result of the external voice and collecting the details of the order and payment from the POS device and storing the details as user personal data, generating a relationship between the user personal data, emotion learning data and customer relationship management (CRM) data as a neural network and generating a user recommendation data including menu recommendation data or promotion information by backward propagating the neural network, outputting the user recommendation data to the display device, processing the user recommendation data into the natural language and outputting a corresponding third conversation sentence by the voice, processing the generated emotion expression data and the user recommendation data, learning a fourth conversation sentence that corresponds to the natural language by using the neural network model, and generating the fourth conversation sentence that corresponds to each the emotion expression data and the user recommendation data by using a result of the learning data generated by using the neural network model, broadcasting a concierge service providing URL for providing marketing information that includes at least one of service recommendation information, promotion information and advertisement information derived by matching the user personal data and the CRM data through a short-distance communication device, processing a concierge service data into the natural language and outputting a corresponding fifth conversation sentence by the voice, wherein the concierge service data is defined by a model, view, and controller (MVC) and comprises at least one of membership guide information, a personal information usage agreement request information, service shop information, service menu information, a waiting number guide information, a product information or service order information, and an online payment service information, the concierge service providing URL comprising at least one of an access address of a concierge service server, an access address of a web space and an access address of a storage device, and the user terminal that selects the concierge service providing URL receives the concierge service data from the access address.

2. The concierge robot system of claim 1, further comprising a server interface device that transmits and receives data to/from an external cloud server in a wired or wireless manner, wherein the program include instructions for transmitting the face image recognized from the external image to the cloud server, receiving the emotion learning data generated by emotion learning that corresponds to the face image from the external cloud server; and for receiving emotion recognition corresponding to the face image by transmitting an emotion recognition request with respect to the face image to the external cloud server.

* * * * *